(12) United States Patent
Moreno Castro

(10) Patent No.: US 10,907,698 B2
(45) Date of Patent: Feb. 2, 2021

(54) DYNAMIC DAMPER

(71) Applicant: Nissan North America, Inc., Franklin, TN (US)

(72) Inventor: Rafael Moreno Castro, Estado de México (MX)

(73) Assignee: Nissan North America, Inc., Franklin, TN (US)

( * ) Notice: Subject to any disclaimer, the term of this patent is extended or adjusted under 35 U.S.C. 154(b) by 378 days.

(21) Appl. No.: 15/970,453

(22) Filed: May 3, 2018

(65) Prior Publication Data

US 2019/0338820 A1 Nov. 7, 2019

(51) Int. Cl.
| | |
|---|---|
| *F16F 1/38* | (2006.01) |
| *F16F 15/14* | (2006.01) |
| *F16F 1/387* | (2006.01) |
| *F16F 15/173* | (2006.01) |

(52) U.S. Cl.
CPC .......... *F16F 1/3821* (2013.01); *F16F 1/3873* (2013.01); *F16F 15/1457* (2013.01); *F16F 15/173* (2013.01); *Y10T 464/50* (2015.01)

(58) Field of Classification Search
CPC .... F16F 1/3821; F16F 15/1457; F16F 1/3873; F16F 15/173; F16F 15/1442; Y10T 464/50
USPC ........... 464/180; 188/379; 74/574.4; 16/400, 16/401
See application file for complete search history.

(56) References Cited

U.S. PATENT DOCUMENTS

| | | | |
|---|---|---|---|
| 5,503,043 A * | 4/1996 | Olbrich | F16F 15/1202 74/574.4 |
| 5,884,902 A | 3/1999 | Hamada et al. | |
| 6,793,050 B2 * | 9/2004 | Nylander | F16F 15/1442 464/180 |
| 6,837,345 B1 | 1/2005 | Lauble et al. | |
| 6,981,579 B2 | 1/2006 | Kuwayama et al. | |
| 7,010,843 B2 | 3/2006 | Haneishi et al. | |

FOREIGN PATENT DOCUMENTS

DE 411233 C2 6/1994

* cited by examiner

*Primary Examiner* — Greg Binda
(74) *Attorney, Agent, or Firm* — Global IP Counselors, LLP

(57) ABSTRACT

A dynamic damper includes a resilient material, an annular mass and a metallic split ring. The resilient material has a central bore formed therethrough dimensioned to receive a vehicle axle. The central bore defines a first inner diameter. The annular mass is surrounded and embedded in the resilient material. The annular mass defines a second inner diameter greater than the first inner diameter. The metallic split ring is embedded within the resilient material along a portion of the surface of the central bore with locking protrusions extending into the central bore. Ends of the locking protrusions define a third inner diameter smaller than the first inner diameter. The locking protrusions is dimensioned to extend into openings in the vehicle axle locking the metallic split ring, the resilient ring and the annular mass to the vehicle axle.

17 Claims, 9 Drawing Sheets

DYNAMIC DAMPER

BACKGROUND

Field of the Invention

The present invention generally relates to dynamic damper for a vehicle axle. More specifically, the present invention relates to dynamic damper that includes a split ring embedded within the dynamic damper, the split ring having a pair of protrusions that snap-fit to openings of the vehicle axle locking the dynamic damper to the vehicle axle.

Background Information

Vehicle axles rotate at high speeds transmitting torque from an engine of a vehicle to wheels of the vehicle. There is a need to dampen any vibrations that might be generated as a result of the high-speed rotation of the vehicle axle.

SUMMARY

One object of the present disclosure is to provide a dynamic damper with a simple structure that simply and quickly installs and locks the dynamic damper to a vehicle axle for rotation therewith.

In view of the state of the known technology, one aspect of the present disclosure is to provide a dynamic damper with a resilient material, an annular mass and a metallic split ring. The resilient material has a central bore formed therethrough dimensioned to receive a vehicle axle. The central bore defines a first inner diameter. The annular mass is surrounded and embedded in the resilient material. The annular mass defines a second inner diameter greater than the first inner diameter. The metallic split ring is also embedded within the resilient material along a portion of the surface of the central bore with locking protrusions extending into the central bore. Distal ends of the locking protrusions define a third inner diameter smaller than the first inner diameter. The locking protrusions are dimensioned to extend into openings in the vehicle axle locking the metallic split ring, the resilient ring and the annular mass to the vehicle axle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
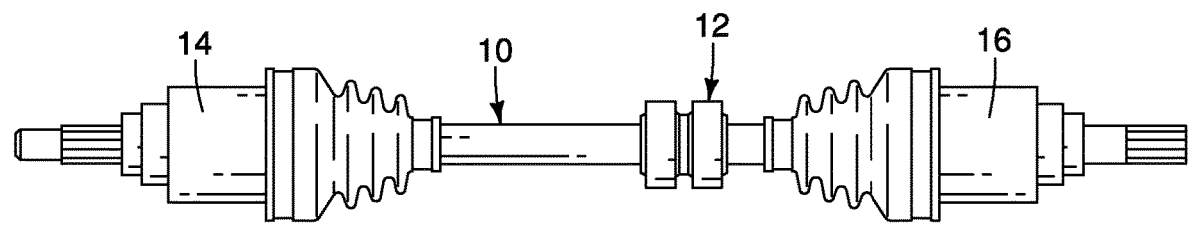
FIG. 1 is a side view of a vehicle axle that includes constant velocity joints and a dynamic damper in accordance with a first embodiment.
Figure 2:
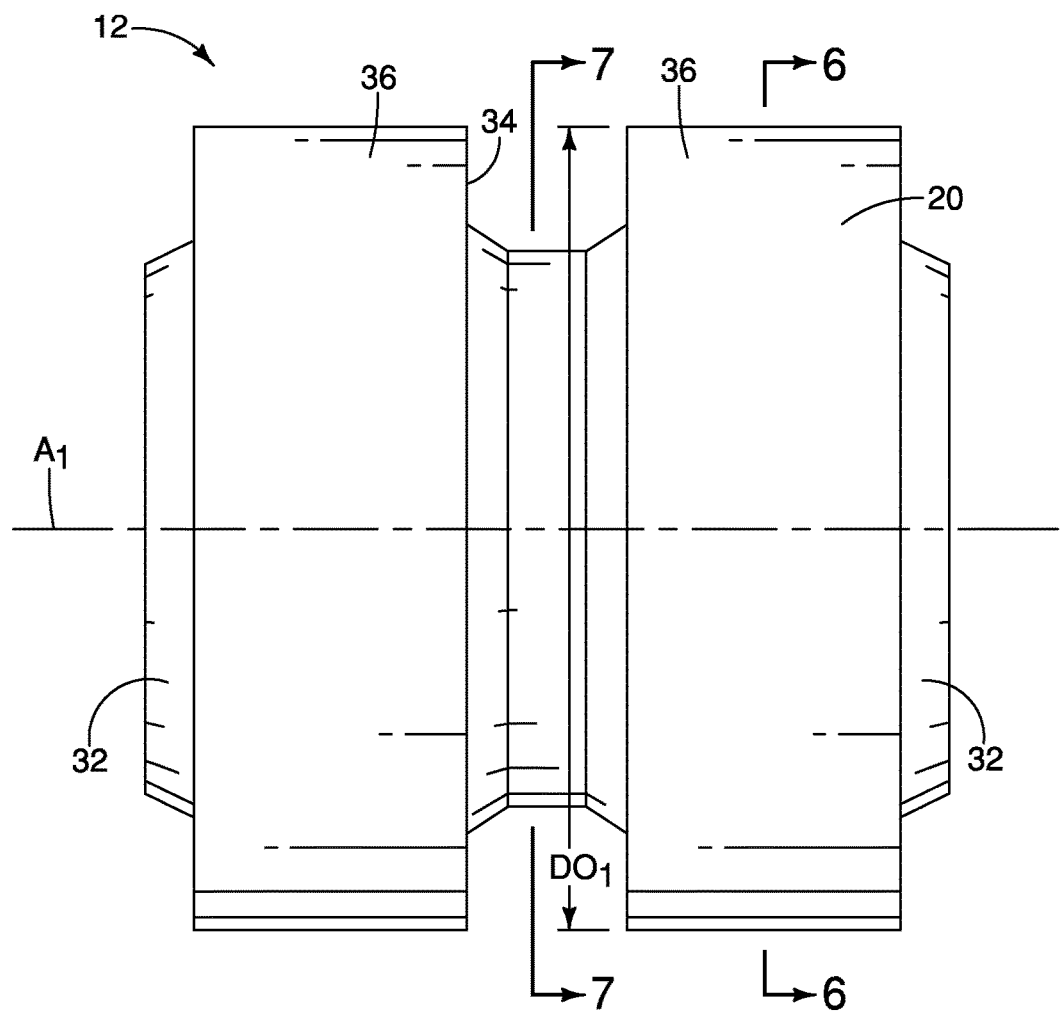
FIG. 2 is a side view of the dynamic damper shown removed from the vehicle axle in accordance with the first embodiment.
Figure 3:
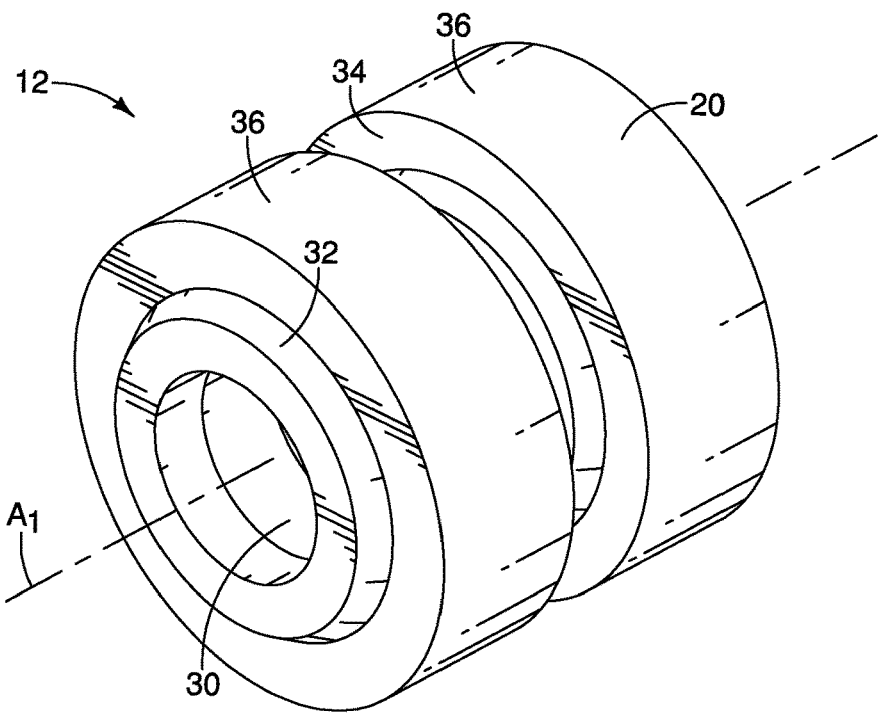
FIG. 3 is a perspective view of the dynamic damper depicted in FIG. 2, shown removed from the vehicle axle in accordance with the first embodiment.

Referring initially to FIG. 1, a vehicle axle 10 with a dynamic damper 12 is illustrated in accordance with a first embodiment.

Figure 4:
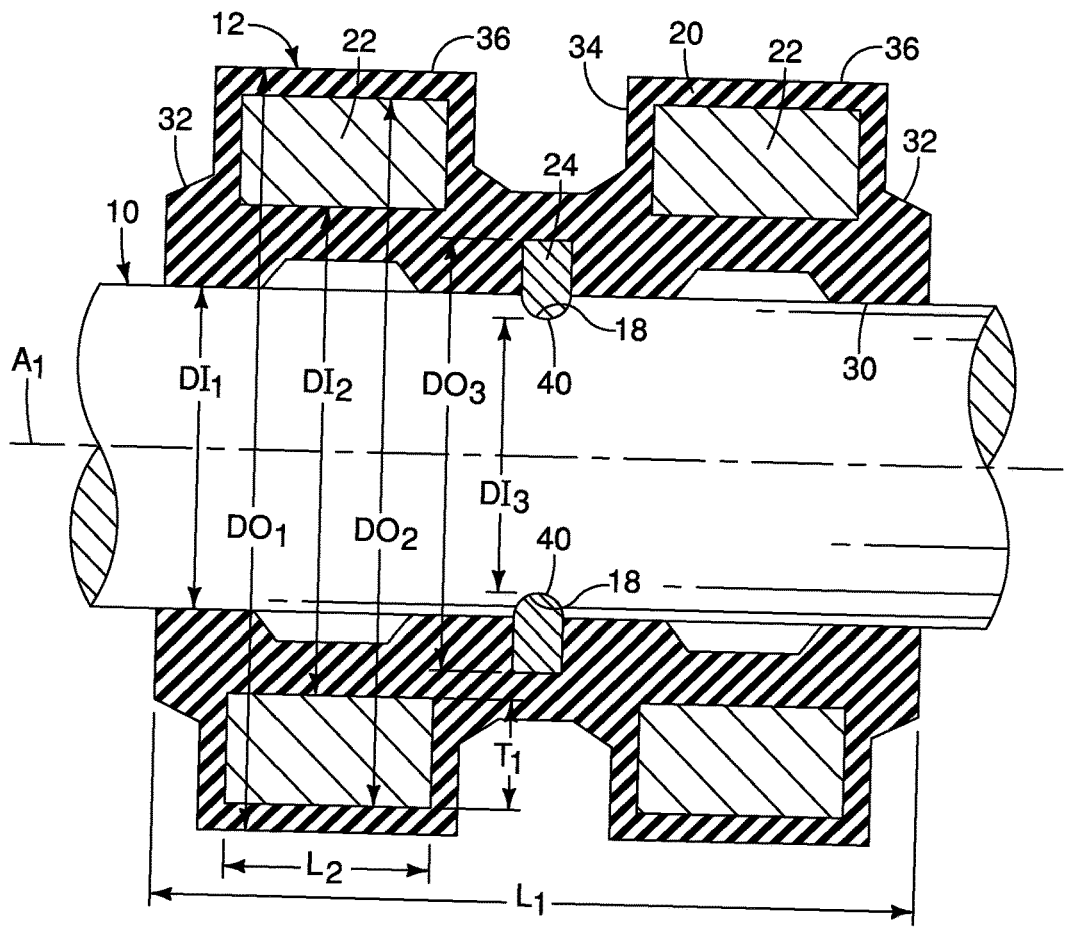
FIG. 4 is a cross-sectional view of the dynamic damper showing a resilient material, a pair of annular masses and a metallic split ring in accordance with the first embodiment.
Figure 5:
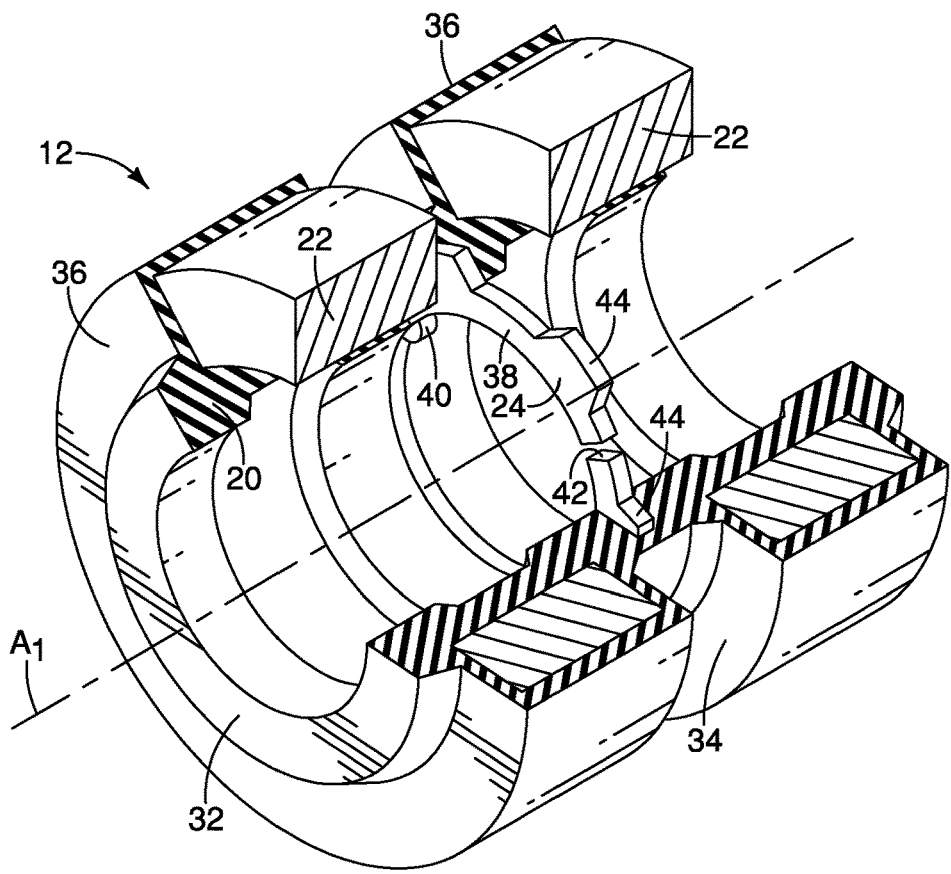
FIG. 5 is a perspective cut-away view of the dynamic damper showing details of the resilient material, the pair of annular masses and the metallic split ring in accordance with the first embodiment.
Figure 6:
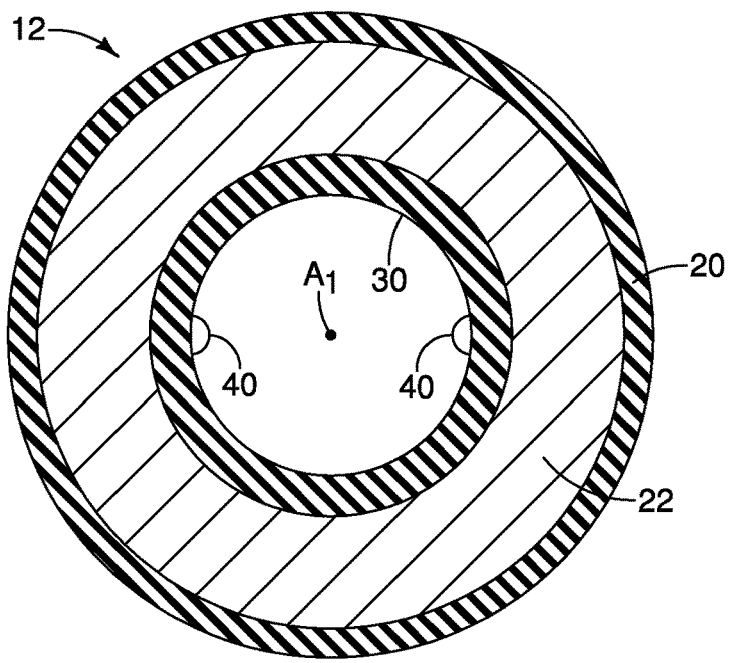
FIG. 6 is a cross-sectional view of the dynamic damper taken along the line 6-6 in FIG. 2, in accordance with the first embodiment.
Figure 7:
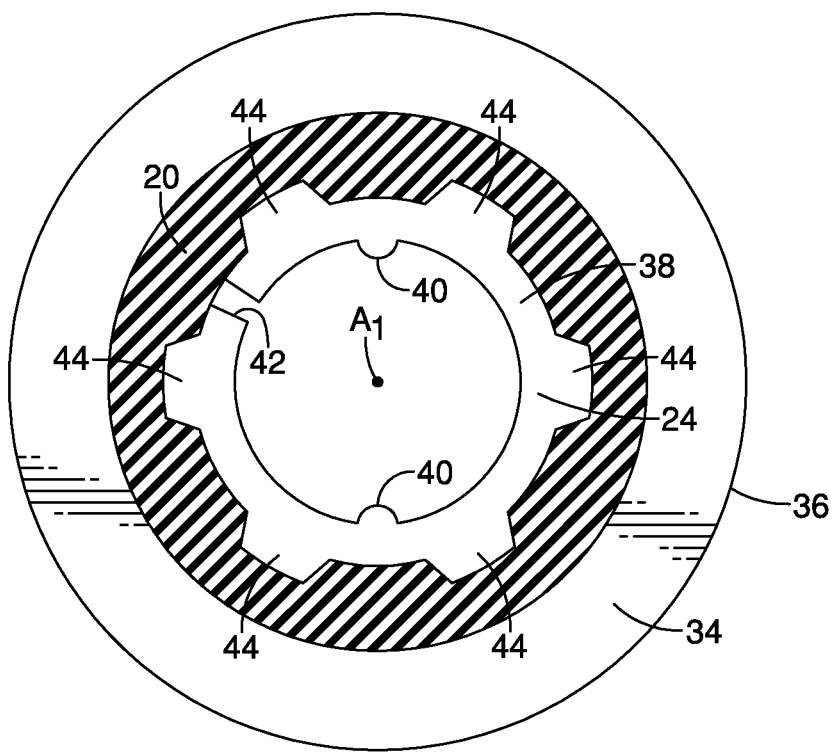
FIG. 7 is a cross-sectional view of the dynamic damper taken along the line 7-7 in FIG. 2, in accordance with the first embodiment.
Figure 9:
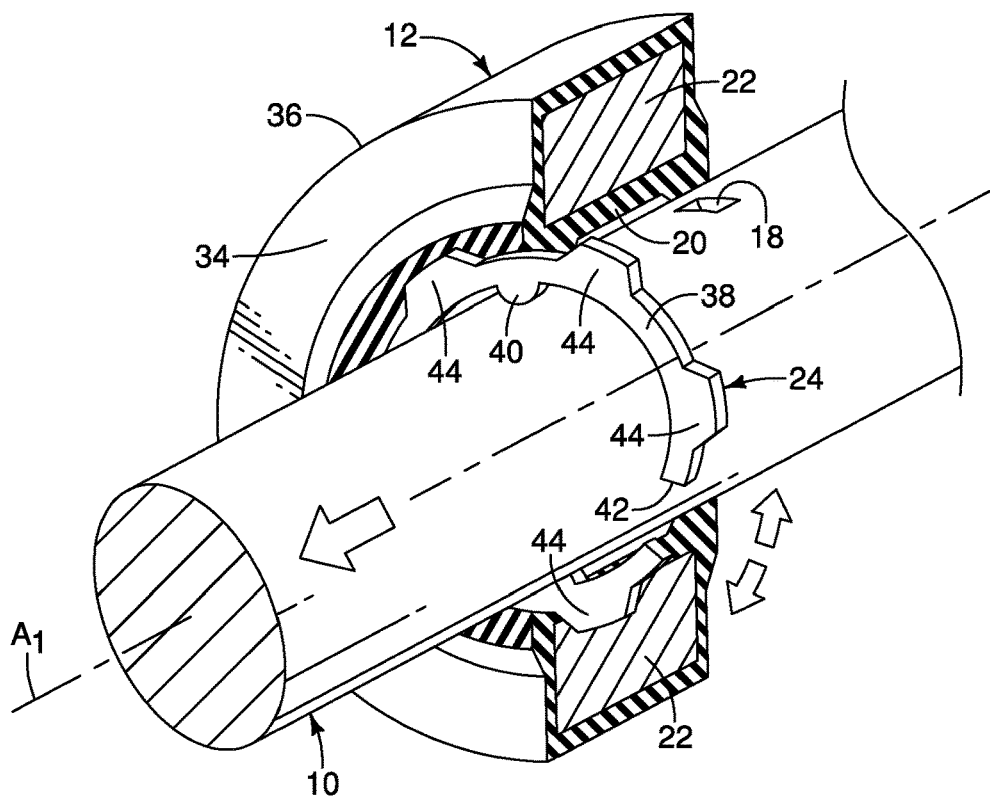
FIG. 9 is a perspective cross-sectional view of the dynamic damper during a process of installing the dynamic damper to the vehicle axle in accordance with the first embodiment.
Figure 10:
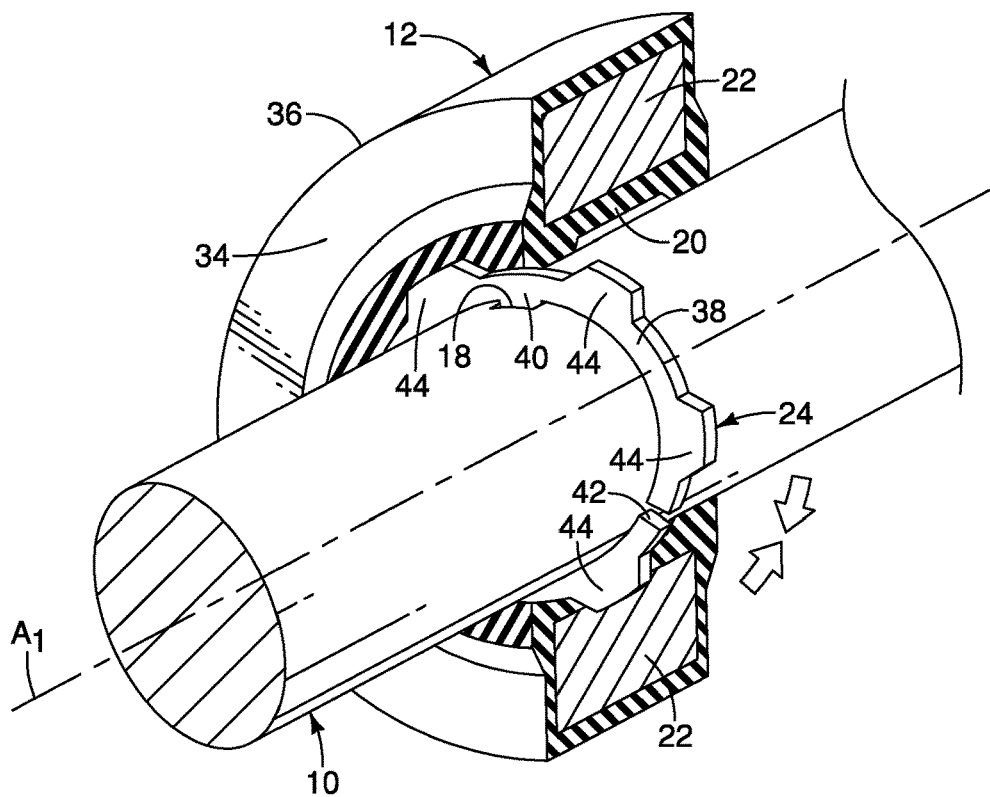
FIG. 10 is another perspective cross-sectional view of the dynamic damper similar to FIG. 9 showing the dynamic damper installed to the vehicle axle in accordance with the first embodiment.

The vehicle axle 10 is a conventional torque transmitting assembly that can include constant velocity joints 14 and 16 at first and second ends thereof, respectively, and the dynamic damper 12. Since constant velocity joints (also known as CV joints) are conventional automotive devices, further description is omitted for the sake of brevity. As shown in FIGS. 4, 9 and 10, the vehicle axle 10 also includes a pair of openings 18 defined on opposite sides thereof, and described in greater detail below.

The vibration dampening functions of the dynamic damper 12 are the same or at least very similar to the vibration dampening functions of the dynamic damper disclosed in U.S. Pat. No. 5,884,902, issued Mar. 23, 1999. Hence, the disclosure of U.S. Pat. No. 5,884,902 is incorporated herein by reference in its entirety.

In a first embodiment depicted in FIGS. 1-10, the dynamic damper 12 basically includes a resilient material 20 (see FIGS. 4-6 and 9-10), a pair of annular masses 22 (see FIGS. 4-7 and 9-10) and a metallic split ring 24 (see FIGS. 4-10).

The resilient material 20 (also referred to as an elastic or rubber material) is made of an elastic rubber or polymer material that has sufficient elasticity to absorb or damper vibrations that might be generated as the vehicle axle 10 rotates, but, has sufficient rigidity to retain its overall shape in response centrifugal forces acting thereon, and, forces associated with temporary annular expansion of the metallic split ring 24, as described further below.

The resilient material 20 basically defines the overall outer shape of the dynamic damper 12. The resilient material 20 has an overall cylindrical shape with a central bore 30 (FIGS. 4-6 and 9-10) extending therethrough. The central bore 30, and the resilient material 20 itself, defines a central axis $A_1$ that coincides with a central axis (not shown) of the vehicle axle 10, with the dynamic damper 12 installed to the vehicle axle 10.

The resilient material 20 has annular projections 32 formed at either end thereof. A central section of the resilient material 20 includes an annular recess 34. On either side of the annular recess 34, cylindrical portions 36 are formed. The annular masses 22 are embedded within respective ones of the cylindrical portions 36.

The pair of annular masses 22 are identical to one another. The annular masses 22 are made of metal, or other heavy material with sufficient mass to produce a gyroscopic effect when rotating at high speeds about the central axis $A_1$. The annular masses 22 are co-axially aligned with the central axis $A_1$ and the vehicle axle 10 with the dynamic damper 12 installed to the vehicle axle 10. Each of the annular masses 22 is completely embedded within a respective one of the cylindrical portions 36 of the resilient material 20, as shown in FIG. 4. The annular masses 22 are spaced apart from one another along the central axis $A_1$. Further, all surfaces of each of the annular masses 22 are completely covered and encased by the resilient material 20.

As shown in FIG. 4, the central bore 30 defines a first inner diameter $DI_1$. Each annular mass 22 defines a second inner diameter $DI_2$ greater than the first inner diameter $DI_1$. The resilient material 22 has a radially outer surface that defines a first outer diameter $DO_1$. The annular mass 22 defines a second outer diameter $DO_2$ that is less than the first outer diameter $DO_1$. The resilient material 22 has an overall length $L_1$ measured along the central axis $A_1$ defined by the central bore 30.

As shown in FIGS. 5 and 7-10, the metallic split ring 24 is at least partially embedded within the resilient material 20. The metallic split ring 24 includes an annular ring portion 38 that is located and centered along a mid-portion (a central portion) of the surface that defines the central bore 30. The annular ring portion 38 of the metallic split ring 24 has an inner diameter that is approximately equal to the first inner diameter $DI_1$ of the central bore 30 (and the outer diameter of the vehicle axle 10), as shown in FIG. 4. The metallic split ring 24 includes two locking protrusions 40 that extend into the central bore 30. Distal ends of the two locking protrusions 40 define a third inner diameter $DI_3$ smaller than the first inner diameter $DI_1$. The locking protrusions 40 are dimensioned to extend into openings 18 of the vehicle axle 10 locking the metallic split ring 24, the resilient ring 20 and the annular masses 22 to the vehicle axle 10, as described below.

The metallic split ring 24 is centered with respect to the central axis $A_1$ and the overall length $L_1$ of the resilient material 30. As shown in FIGS. 5 and 7-10, the annular ring portion 38 of the metallic split ring 24 includes a gap 42 (or split) that is configured to receive a spreader tool (not shown) that can widen the gap 42, thereby increasing the inner diameter $DI_3$ defined between distal ends of the locking protrusions 40. A radially outer surface of the annular ring portion 38 of the metallic split ring 24 includes a plurality of protrusions 44, as shown in FIGS. 7-10. In the depicted embodiment six protrusions 44 that extend radially outward away from the annular ring portion 38.

The radially outward protrusions 44 along with the radially extending surfaces of the annular ring portion 40 are embedded within the resilient material 20, thereby fixing the metallic split ring 24 in position within the resilient material 20.

It should be understood from the drawings and the description herein that the number of the radially outward protrusions 44 can be varied. Specifically, there can be any number of radially outward protrusions 44 from, for example 2 radially outward projections, to 20 radially outward projections. Further, the projections 44 can alternatively be provided with openings (not shown) such that the resilient material 20 extends through the openings, further embedding the metallic split ring 24 within the resilient material and further retaining the metallic split ring 24 in a generally fixed position within the resilient material 20.

As demonstrated in FIGS. 9 and 10, the annular ring portion 38 of the metallic split ring 24 is dimensioned and shaped such that the metallic split ring 38 expands (FIG. 9) from its original shape during installation to the vehicle axle 10 and resiliently returns to its original shape such that the locking protrusions 40 extend into the openings 18 of the vehicle axle 10. In other words, during installation, the gap 42 (the split) is widened, elastically deforming the annular ring portion 38 such that the locking protrusions 40 are moved away from one another. The dynamic damper 12 is then slid onto the vehicle axle 10 (FIG. 9). Once positioned with the openings 18 and the locking protrusions 40 aligned, the locking protrusions 40 move into the openings 18 of the vehicle axle 10, thereby locking the dynamic damper 12 to the vehicle axle 10.

Since the resilient material 20 has some flexibility, when the metallic split ring 24 is expanded (the gap 42 increased), the metallic split ring 24 remains attached to the resilient material 20.

Figure 8:
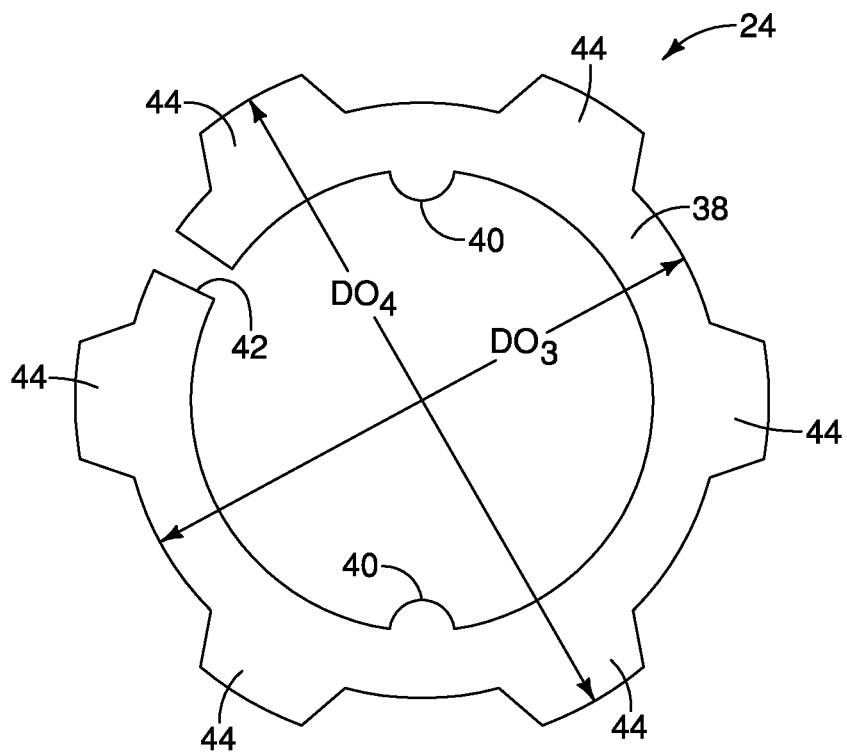
FIG. 8 is an end view of the metallic split ring shown removed from the dynamic damper in accordance with the first embodiment.

In the first embodiment, several dimensional relationships are observed. For example, as shown in FIGS. 4 and 8, the radially outer surface of the annular ring portion 38 of the metallic split ring 24 defines a third outer diameter $DO_3$ that is smaller than the second inner diameter of the annular mass 22. The radially outward protrusions 44 of the metallic split ring 24 defines a fourth outer diameter $DO_4$ that is approximately equal to or less than the second inner diameter $DI_2$ of the annular mass 22. However, since the metallic split ring 24 is located between and spaced apart from the two annular masses 22, there is no direct contact between the metallic split ring 24 and the annular masses 22. Further, an axial length $L_2$ of the annular mass 22 is approximately twice a radial thickness $T_1$ of the annular mass 22 (FIG. 4).

The dynamic damper 12 installs quickly and simply to the vehicle axle 10. Hence, installation and assembly time is reduced providing an improvement over prior designs and configurations.

The inclusion of the metallic split ring 24 in the various embodiments of the dynamic damper 12 described herein makes it possible to eliminate the use of conventional clamping rings or straps often used to secure the dynamic damper 12 to the vehicle axle 10. Further, the metallic split ring 24 retains the dynamic damper 12 to the vehicle axle 10, and, locks the dynamic damper 12 to the vehicle axle 10 for rotation therewith due to the engagement between the protrusions 40 and the openings 18 in the vehicle axle 10.

Second Embodiment

Figure 11:
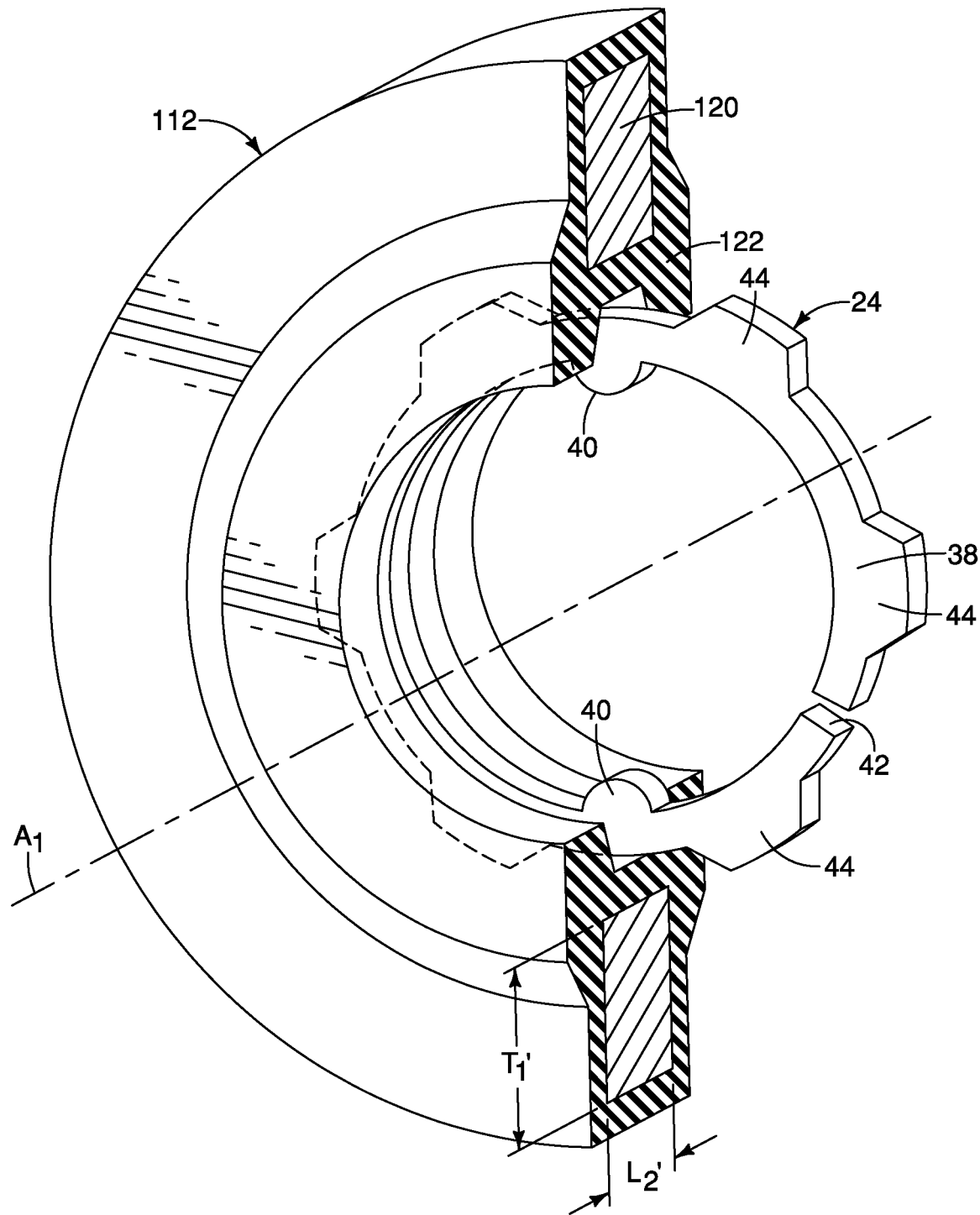
FIG. 11 is a cross-sectional view of a portion of a dynamic damper showing the metallic split ring in accordance with a second embodiment.
Figure 12:
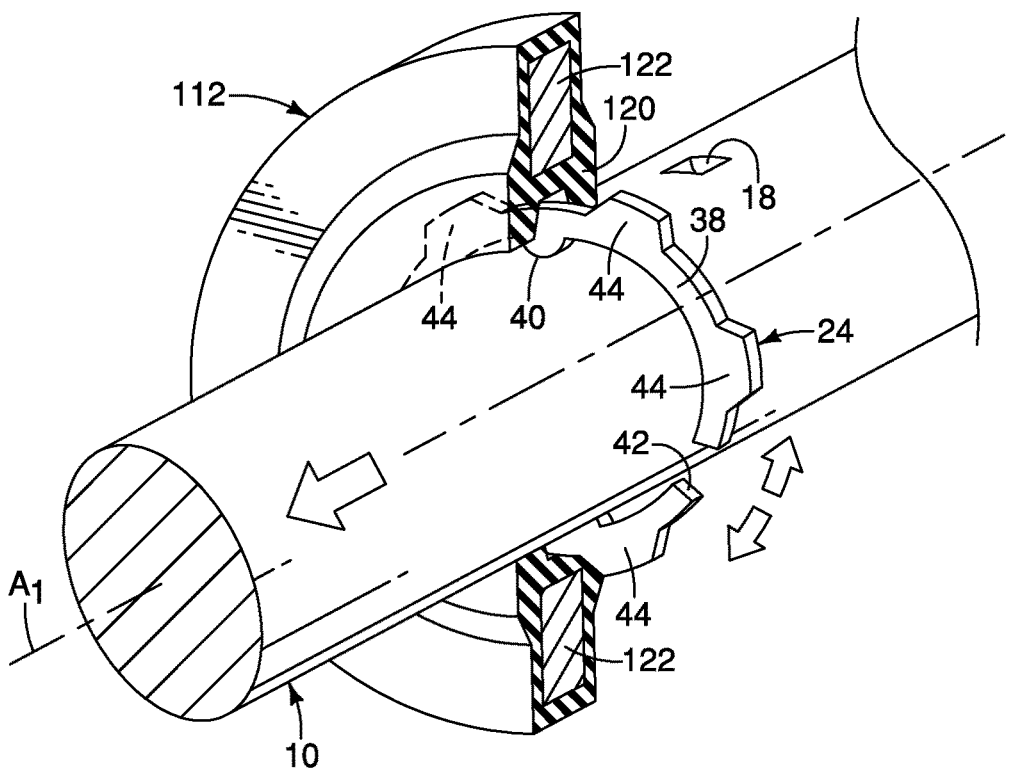
FIG. 12 is a perspective cross-sectional view of the dynamic damper during a process of installing the dynamic damper to the vehicle axle in accordance with the second embodiment.
Figure 13:
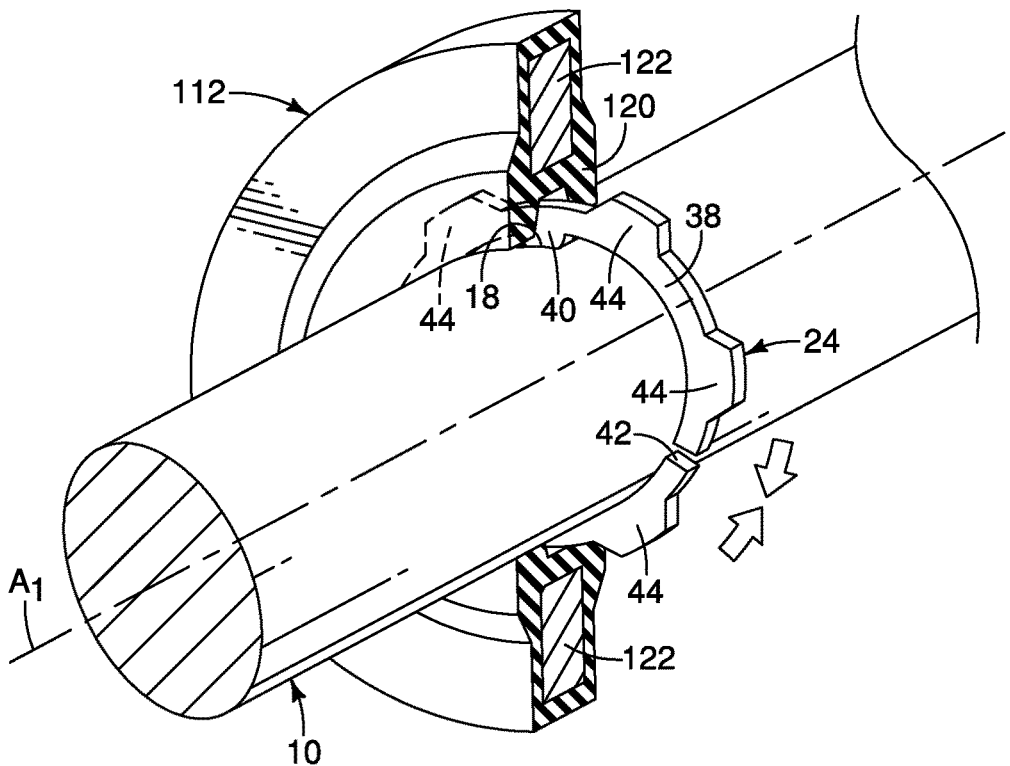
FIG. 13 is another perspective cross-sectional view of the dynamic damper similar to FIG. 12 showing the dynamic damper installed to the vehicle axle in accordance with the second embodiment.

Referring now to FIGS. 11-13, a dynamic damper 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the dynamic damper 12 of the first embodiment is replaced with the dynamic damper 112, which has been modified as compared to the dynamic damper 12. The dynamic damper 112 of the second embodiment includes a resilient material 120, an annular mass 122 and the metallic split ring 24 (as described above with respect to the first embodiment).

In the second embodiment, the annular mass 122 has an axial length $L_2$, that is approximately half a radial thickness $T_1$, of the annular mass 122 (FIG. 11). In the first embodiment, the axial length $L_2$ of the annular mass 22 is approximately twice the radial thickness $T_1$ of the annular mass 22. Hence, since the annular mass 122 of the second embodiment is embedded within the resilient material 120, the overall shape of the resilient material 120 differs from that of the first embodiment.

In the second embodiment, there can be two annular masses 122 similar to the first embodiment. However, only one annular mass 122 is depicted. The metallic split ring 24 is as described in the first embodiment. Further, as shown in FIGS. 12 and 13, the metallic split ring 24 is expandable such that the dynamic damper 112 is easily installed to the vehicle axle 10.

Third Embodiment

Figure 14:
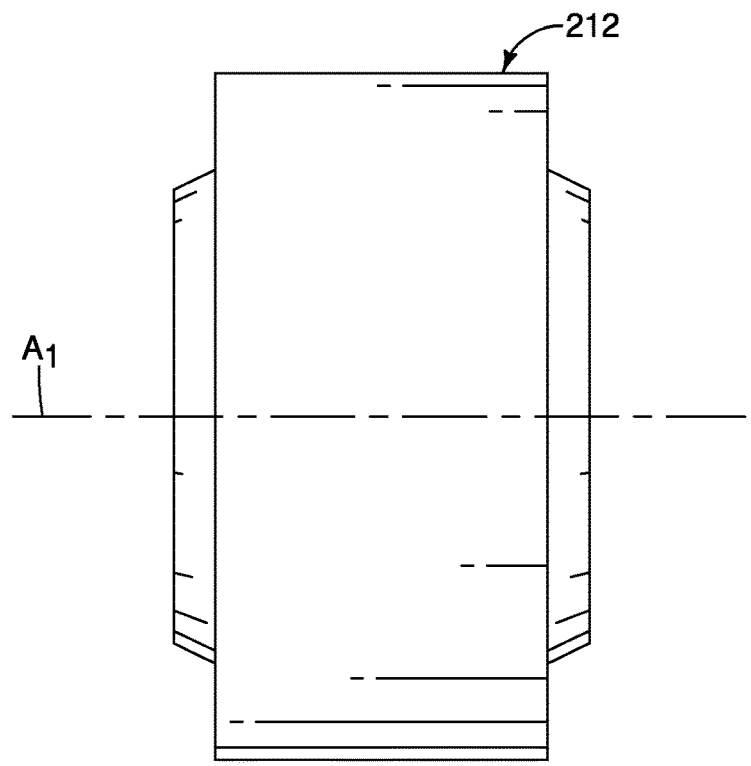
FIG. 14 is a side view of a dynamic damper shown removed from the vehicle axle in accordance with a third embodiment.
Figure 15:
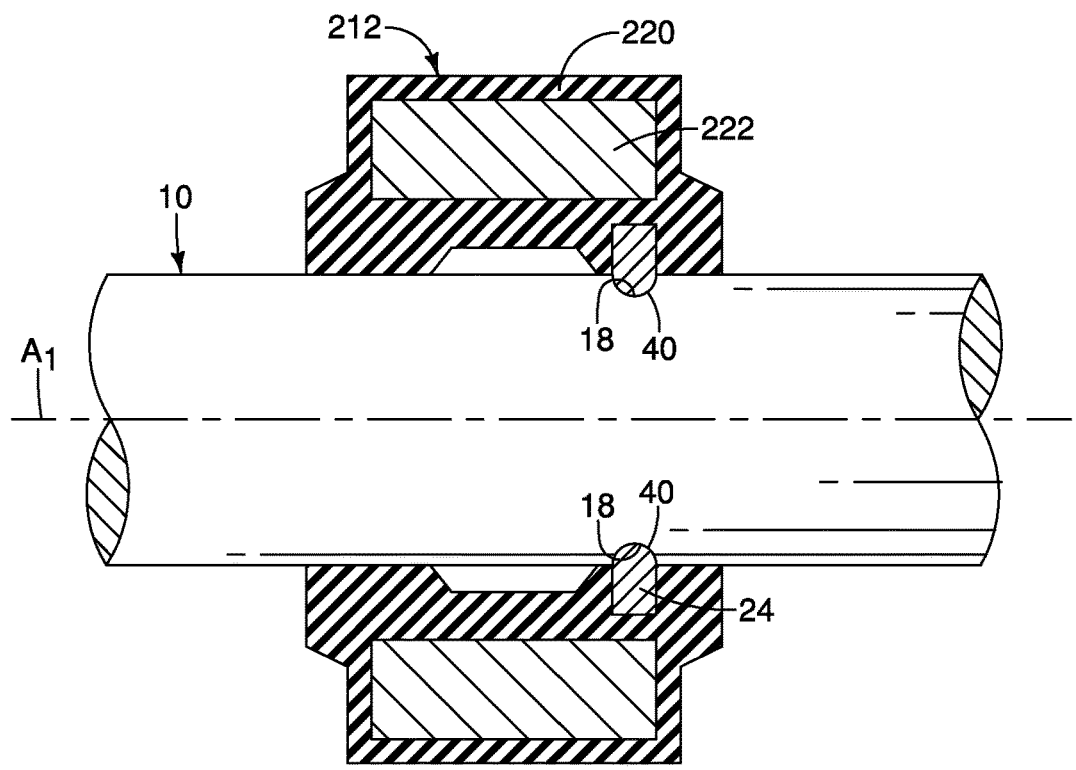
FIG. 15 is a side cross-sectional view of the dynamic damper depicted in FIG. 14, installed to the vehicle axle in accordance with the third embodiment.

Referring now to FIGS. 14-15, a dynamic damper 212 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the dynamic damper 12 of the first embodiment is replaced with the dynamic damper 212, which has been modified as compared to the dynamic damper 212. The dynamic damper 212 of the third embodiment includes a resilient material 220, a single annular mass 222 and the metallic split ring 24 (as described above with respect to the first embodiment).

In the third embodiment, the dynamic damper 212 is simplified, as compared to the dynamic damper 12 of the first embodiment. Specifically, there is only one annular mass 222 in the dynamic damper 212. Further, the resilient material 220 has a shorter overall length in an axial direction since there is only one annular mass 222.

The metallic split ring 24 is embedded within the resilient material 220 along with the annular mass 222. In the depicted third embodiment, the metallic split ring 24 is off-center, as compared to the annular mass 222 along the central axis $A_1$. Alternatively, the metallic split ring 24 can be centered relative to the annular mass 222 along the central axis $A_1$.

Fourth Embodiment

Figure 16:
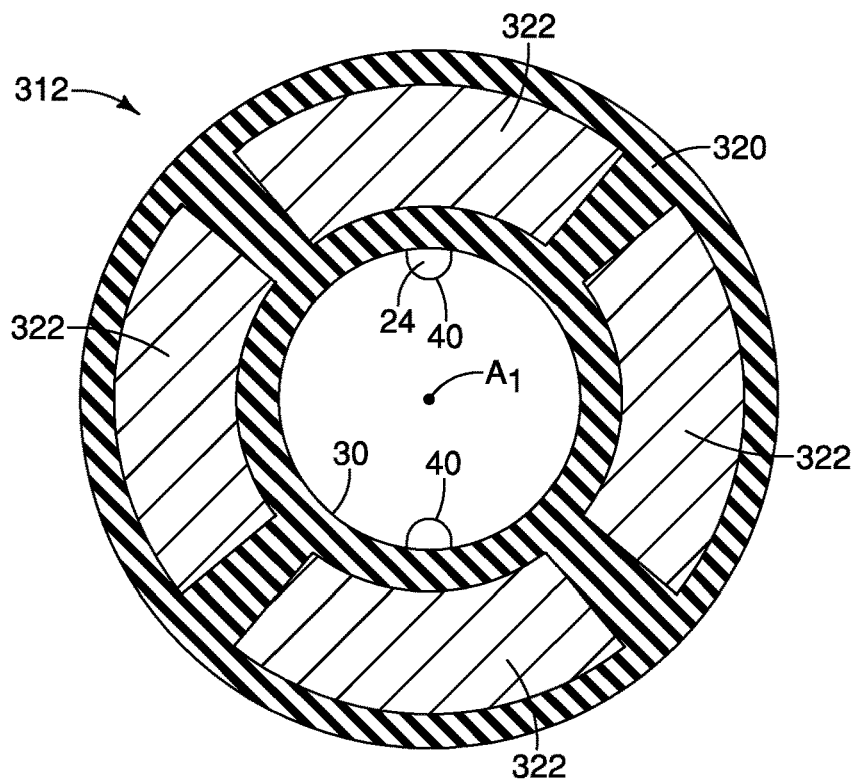
FIG. 16 is an end view of a dynamic damper shown removed from the vehicle axle in accordance with a fourth embodiment.

Referring now to FIG. 16, a dynamic damper 312 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the dynamic damper 312 is modified, as compared to the dynamic damper 12 of the first embodiment. Specifically, the annular masses 22 have been replaced with annular mass wedges 322. The dynamic damper 312 includes a resilient material 320, the annular mass wedges 322 and the metallic split ring 24 (as described above with respect to the first embodiment).

In the fourth embodiment, four annular mass wedges 322 replace one of the annular masses 22. In other words, in the fourth embodiment, each of the pair of annular masses 22 is replaced by four annular mass wedges 322. The resilient material 320 is modified such that all surfaces of each annular mass wedge 322 is completely surrounded and embedded within the resilient material 320. The four annular mass wedges 322 together define an overall annular shape.

Fifth Embodiment

Figure 17:
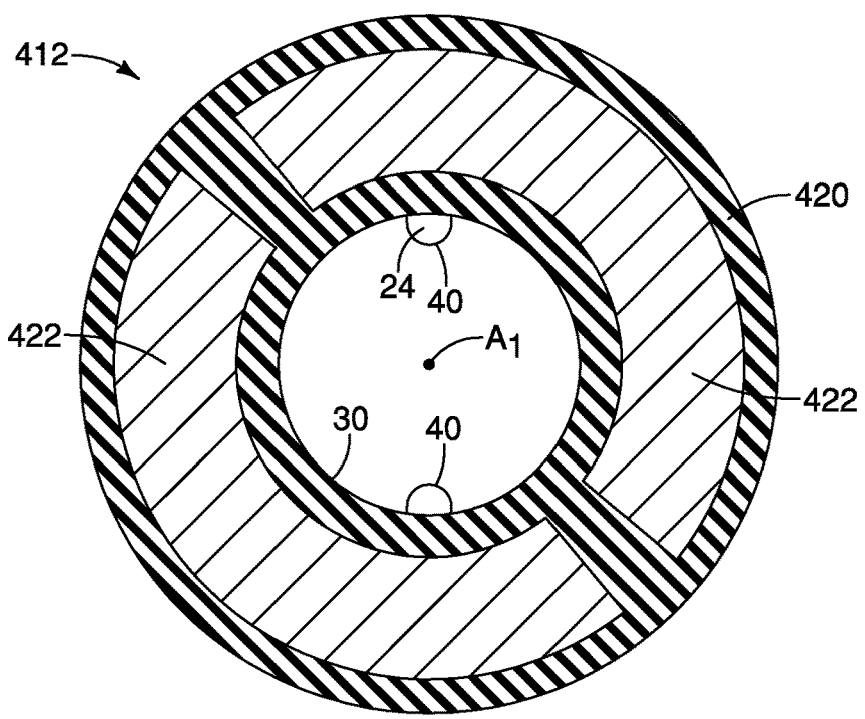
FIG. 17 is an end view of a dynamic damper shown removed from the vehicle axle in accordance with a fifth embodiment.

Referring now to FIG. 17, a dynamic damper 412 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the dynamic damper 412 is modified, as compared to the dynamic damper 12 of the first embodiment. Specifically, the annular masses 22 have been replaced with annular mass wedges 422. The dynamic damper 412 includes a resilient material 420, the annular mass wedges 422 and the metallic split ring 24 (as described above with respect to the first embodiment).

In the fifth embodiment, two annular mass wedges 422 replace one of the annular masses 22. In other words, in the fifth embodiment, each of the pair of annular masses 22 is replaced by two annular mass wedges 422. The resilient material 320 is modified such that all surfaces of each annular mass wedge 422 is completely surrounded, and, embedded within the resilient material 420. The two annular mass wedges 422 together define an overall annular shape.

It should be understood from the drawings and the description herein, that the annular mass 22 of the first embodiment can be replaced by any number of annular mass wedges, where the number of wedges can range from 2-8, for example.

The vehicle axle 10 constant velocity joints 14 and 16 (without the dynamic dampers described above) are conventional components that are well known in the art. Since vehicle axles and constant velocity joints are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the dynamic damper. Accordingly, these terms, as utilized to describe the present invention should be interpreted relative to a vehicle equipped with the dynamic damper.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A dynamic damper comprising:
a resilient material having a central bore formed therethrough dimensioned to receive a vehicle axle, the central bore defining a first inner diameter;
an annular mass surrounded and embedded in the resilient material, the annular mass defining a second inner diameter greater than the first inner diameter; and
a metallic split ring embedded within the resilient material along a portion of the surface of the central bore with locking protrusions extending into the central bore, distal ends of the locking protrusions defining a third inner diameter smaller than the first inner diameter, the locking protrusions being dimensioned to extend into openings in the vehicle axle locking the metallic split ring, the resilient ring and the annular mass to the vehicle axle.

2. The dynamic damper according to claim 1, wherein the resilient material has a radially outer surface that defines a first outer diameter, and the annular mass defining a second outer diameter that is less than the first outer diameter.

3. The dynamic damper according to claim 1, wherein the metallic split ring is dimensioned and shaped such that the metallic split ring expands from its original shape during installation to the vehicle axle and resiliently returns to its original shape such that the locking protrusions extend into the openings of the vehicle axle.

4. A dynamic damper comprising:
a resilient material having a central bore formed therethrough dimensioned to receive a vehicle axle, the central bore defining a first inner diameter;
an annular mass surrounded and embedded in the resilient material, the annular mass defining a second inner diameter greater than the first inner diameter; and
a metallic split ring embedded within the resilient material along a portion of the surface of the central bore with locking protrusions extending into the central bore, distal ends of the locking protrusions defining a third inner diameter smaller than the first inner diameter, the locking protrusions being dimensioned to extend into openings in the vehicle axle locking the metallic split ring, the resilient ring and the annular mass to the vehicle axle, the metallic split ring having a radially outer surface embedded within the resilient material, the radially outer surface of the metallic split ring having a plurality of radially outwardly extending projections embedded within the resilient material.

5. The dynamic damper according to claim 4, wherein the plurality of radially outwardly extending projections of the metallic split ring includes six radially outwardly extending projections.

6. The dynamic damper according to claim 5, wherein the radially outer surface of the metallic split ring defines a third outer diameter that is smaller than the second inner diameter of the annular mass.

7. The dynamic damper according to claim 4, wherein the resilient material has an overall length as measured along a central axis defined by the central bore, and the metallic split ring is centered with respect to the central axis and the overall length of the resilient material.

8. The dynamic damper according to claim 7, wherein the annular mass includes a first annular mass and a second annular mass that spaced apart from one another relative along the central axis and the overall length of the resilient material.

9. The dynamic damper according to claim 4, wherein the annular mass includes a plurality of arcuately shaped wedges that together define an overall annular shape.

10. A dynamic damper comprising:
a vehicle axle having a first end and a second end with a pair of openings defined on opposite sides of the vehicle axle between the first end and the second end;

a resilient material having a central bore formed therethrough installed to the vehicle axle, the central bore defining a first inner diameter equal to an outer diameter of the vehicle axle;

an annular mass surrounded and embedded in the resilient material, the annular mass defining a second inner diameter greater than the first inner diameter; and a metallic split ring embedded within the resilient material along a portion of the surface of the central bore with locking protrusions extending into the central bore, ends of the locking protrusions defining a third inner diameter smaller than the first inner diameter, the locking protrusions extending into the pair of openings in the vehicle axle locking the metallic split ring, the resilient material and the annular mass to the vehicle axle.

11. The dynamic damper according to claim 10, wherein the metallic split ring is dimensioned and shaped such that the metallic split ring expands from its original shape during installation to the vehicle axle and resiliently returns to its original shape once installed to the vehicle axle with the locking protrusions extending into the pair of openings of the vehicle axle.

12. The dynamic damper according to claim 10, wherein the metallic split ring has a radially outer surface embedded within the resilient material, the radially outer surface of the metallic split ring having a plurality of radially outwardly extending projections embedded within the resilient material.

13. The dynamic damper according to claim 12, wherein the plurality of radially outwardly extending projections of the metallic split ring includes six radially outwardly extending projections.

14. The dynamic damper according to claim 13, wherein the radially outer surface of the metallic split ring defines a third outer diameter that is smaller than the second inner diameter of the annular mass.

15. The dynamic damper according to claim 10, wherein the resilient material has an overall length as measured along a central axis defined by the central bore, and the metallic split ring is centered with respect to the central axis and the overall length of the resilient material.

16. The dynamic damper according to claim 15, wherein the annular mass includes a first annular mass and a second annular mass that spaced apart from one another relative along the central axis and the overall length of the resilient material.

17. The dynamic damper according to claim 10, wherein the annular mass includes a plurality of arcuately shaped wedges that together define an overall annular shape.

* * * * *